2 Sheets--Sheet 1.

T. ROBJOHN.

Sewing-Machine for Making Band Ruffling.

No. 6,566. Reissued July 27, 1875.

WITNESSES.

James McMahon

W. J. Macvey

INVENTOR.

Geo. H. Worster

Agent of Thomas Robjohn

2 Sheets--Sheet 2.
T. ROBJOHN.
Sewing-Machine for Making Band Ruffling.
No. 6,566. Reissued July 27, 1875.
FIG. 5.
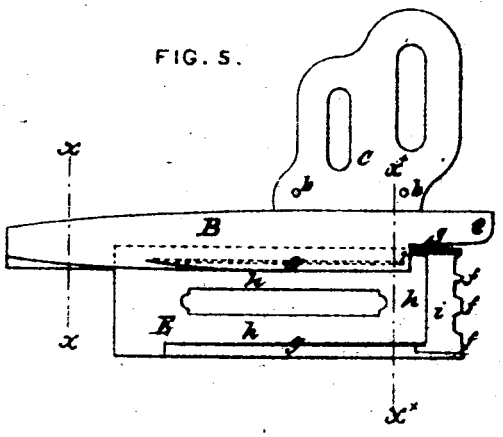
FIG. 3.
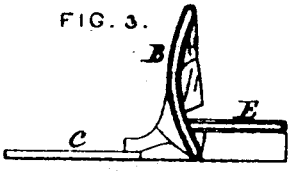
FIG. 4.
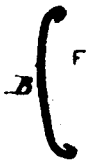
FIG. 9.
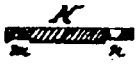
FIG. 3.
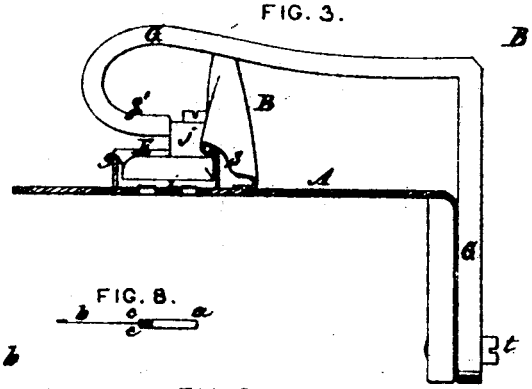
FIG. 4.
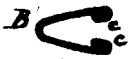
FIG. 7.
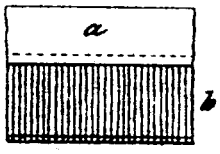
FIG. 8.
FIG. 6.
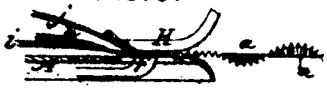
WITNESSES.
James Jno. Mahon
INVENTOR.
Geo. H. Worster
Assignee of Thomas Robjohn

6,566. SEWING-MACHINES FOR MAKING BAND-RUFFLING. Geo. H. Wooster, New York, N. Y., assignee, by mesne assignments, of T. Robjohn. Patent No. 46,424, dated Feb. 14, 1865. [Filed July 19, 1875.]

*To all whom it may concern:*

Be it known that I, THOMAS ROBJOHN, of the city, county, and State of New York, have invented certain Improvements in Machinery for Making Band-Ruffling, of which the following is a specification:

This invention relates to improvements in rufflers for use with sewing mechanism; and consists in a ruffling blade or knife adapted to engage a strip of material to be ruffled, in combination with a feeding mechanism adapted to operate against the strip to which the ruffled strip is connected; also, in the combination, with a ruffling-blade, of a guide for the strip to be ruffled, and also with a guide to fold and present a band about the edges of the ruffled strip, as is hereinafter more fully described, such folding-guide also being adapted to hem or turn the edges of the folded band.

Figure 1:
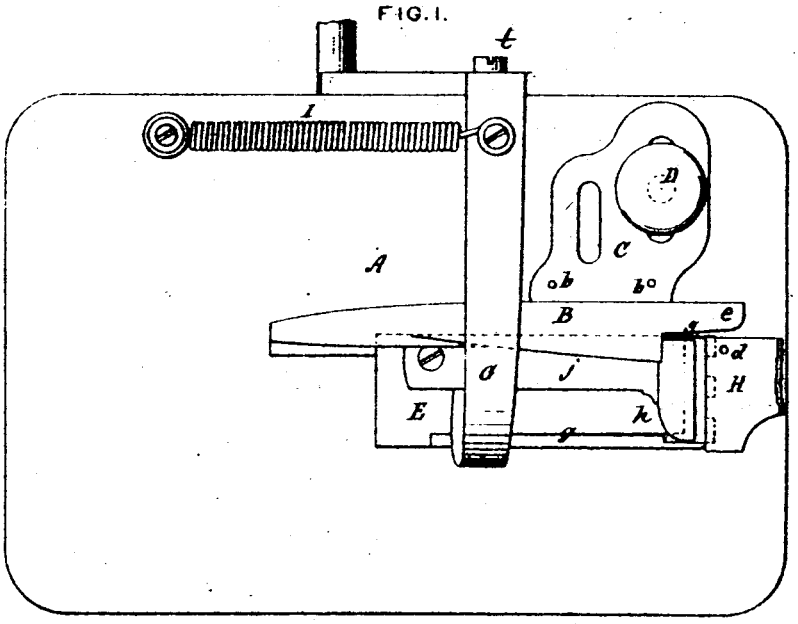
Figure 2:
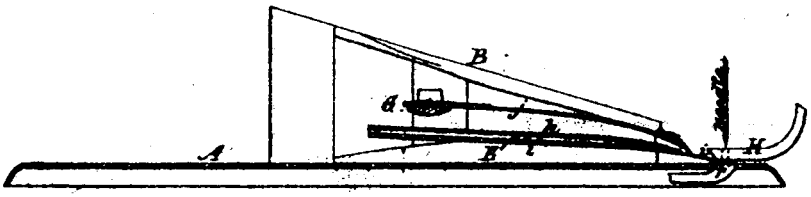

Figure 1 is a top view of the invention, showing its arrangement upon the bed-plate of a sewing-machine. Fig. 2 is a longitudinal vertical section of the same. Figs. 3 and 3* are opposite end views of the ruffling-machinery. Figs. 4 and 4* are transverse sections of the band-folder. Fig. 5 is a top view of the guides without the ruffling-knife. Fig. 6 is a section of the plaiting or ruffling device parallel with Fig. 2, but showing a different position of the same. Fig. 7 is a face view of a ruffle made by the machine; and Fig. 8 is a transverse section of the same. Fig. 9 is a section of the presser, taken at right angles to the line of feed, showing the under surface cut away to allow the passage of a hem on the ruffle.

Similar letters of reference indicate corresponding parts in the several figures.

As illustrated in the drawings, one strip of muslin or cloth has both edges turned in, and is folded longitudinally to form a double band, and another strip is plaited or formed into a ruffle, and the band and the ruffle are both sewed together at the same time, thus forming a band-ruffle at one operation.

To enable others skilled in the art to make and use my invention, I will now proceed to illustrate the most complete and perfect form of its operation as combined with a sewing-machine.

At A is represented the bed-plate of a sewing-machine. B is the guide by which the turning in of the edges of, and the folding of, the band *a* of the ruffle is performed, said guide being attached to the gage-plate C, and secured to the bed-plate A, by a screw, D, and steady-pins *b b*. This guide B is made of brass or other metal, and has one end formed as a tube, and of a width substantially equal to the width of the strip of cloth of which the band *a* of the ruffle is to be formed. The receiving end of this guide is shown at Fig. 3, and at a short distance from such end one side of said tube is cut away, leaving the guide in the form of a transversely-curved plate with its edge turned over on the concave side, as shown in Fig. 4, and toward the other end its curvature increases, and the turning in of the edges is increased until the plate is in the form of the letter V, or nearly double, and its edges are given a double turn, as shown at *c c* in Fig. 4*, so that the band or plain strip to which the ruffle is to be united by stitches, when entered at the end shown in Fig. 3, and drawn through the guide, will come out folded along the center, and both edges may be turned in or hemmed, as shown in Fig. 4*, provided the strip is wide enough to extend into and entirely fill the width of the guide. The arrangement of this guide upon a sewing-machine is such that this folding of the band may be effected as the band is moved toward the needle by the feeding device *r*. The marginal portions *c c* of the folder, by which the edges of the band are turned inward, do not extend quite to the needle-hole *d*, as shown at *s* in Figs. 1, 3*, and 5, though the guide which produces the central fold has a nose, *e*, extending some distance beyond the needle-hole to preserve the form of the fold in the band while the stitching is being performed. E is a guide for the strip of cloth of which the ruffle is to be formed, consisting of a flat metal tube, of a width equal to that of the said strip, and it is shown as arranged in front of, and partly within, the folding-guide B, parallel with the feed-movement, and adapted to deliver the ruffled strip between the two edges of the band *a*, as the latter issues from the said guide B.

The bottom plate *i* of the guide serves as the support for the strip or material to be ruffled, separates it from the fabric to which it is to be united, and the ruffling-blade, acting on such material to be ruffled, carries it forward over the support *i*, and presents it in a folded condition to the stitching mechanism. This bottom plate *i* is made with projections *f f*, to enable it to pass between and at the sides of the toothed surfaces of the feeder *r*; and the upper part of the said guide has formed in it two longitudinal slits, *g g*, commencing at a short distance from the end farthest from the needle, and extending to the end next the needle, the end of the tongue *h*, thus formed, being adapted to press upon the strip passing through the guide with sufficient force to keep it flattened and straight on its way to the action of the ruffling-blade. The said tongue *h* does not extend so near to the needle-hole as the bottom plate *i*, (see Fig. 2,) thereby leaving the said plate exposed for the plaiting or ruffling blade or knife to work upon, as will be presently described.

The plaiting or ruffling blade or knife is generally made with a straight and moderately-sharp but not a cutting edge, of a length equal to the width of the strip of which the ruffle is to be composed, the said edge being arranged at right angles to the feed-movement, and connected with or forming part of an elastic shank, *j*, attached to a bent lever, G. In its forward movement the edge of the ruffling blade or knife is pressed upon the support or plate *i*, between the front part of which and the knife the strip to be ruffled is held.

The lever G works on a fixed fulcrum, *t*, at the back of the bed-plate, and derives motion in one direction from the rod which works the needle-arm, and in the opposite direction from the spring I, or has imparted to it by any other mechanical means the necessary motion to produce a movement of the blade or knife. This movement of the lever may be varied by means of a set-screw, to give the knife a greater or less movement, according as finer or not so fine plaiting or ruffling is desired, the movement of the knife requiring to be as much greater than the feed-movement as the intended widths of the plaits. This knife commences its movement before the feed, and when the knife has moved a distance equal to the intended widths of the plaits, the feed-movement commences, and the movement of the knife continues at the same speed as the feed-movement, while the feeding device carries forward both the band or plain part to which the ruffle is attached and the ruffle.

The presser H, which, as shown, is the foot of a sewing-machine, is represented of a width substantially equal to the width of the blade or knife, or sufficient to cover the whole width of the ruffle and a sufficient portion of the band; but it is made shorter than usual at the end where the work enters beneath it, in order to allow the knife to come close or nearly close to the needle; and its under side is beveled at that end to allow the knife to pass under and push the plaits under it as it gathers them up by its movement. The lower surface is recessed or cut away at the side, as shown at *m*, in Fig. 9, to allow the hem of the ruffle, (Fig. 8,) to pass under without lifting the presser from the rest of the goods; and the foot is also recessed at *n* to receive the band of the ruffle.

The sewing-machine, in connection with which this invention is applied, may be of any of the kinds in common use.

To set the invention in operation, the strip of cloth to form the band *a* is inserted through the guide B, and the longer strip to form the ruffle (which has been previously hemmed along one edge) is inserted through the guide E, and under the ruffling blade or knife, and with its hemmed edge in front or outward, and the ends of both strips are brought under the presser, and when the presser has been let down upon them the machine is set in operation. The two strips are drawn forward by the feeding-device, the band is folded and has its edge turned in, and the strip resting on the support *i* is ruffled, delivered to the unruffled material or the band by the action of the knife, as hereinbefore described, and the ruffled and plain fabric are united by the stitching mechanism of the sewing-machine, the neddle, when operating with the band, passing through both the upper and lower parts thereof, close to the edges of the band.

In the ruffling operation the blade or knife is prevented from acting on the band or plain fabric beneath the ruffle by the support or plate *i*.

No claim is made to an open guide in combination with ruffling mechanism, as that is the form of gages which has been previously used; nor to a separating device except in combination with the ruffling mechanism arranged and operated above the table.

The ruffled strip may be stitched as formed, onto a plain fabric introduced under the guide E, and between the support or plate *i* and the feeder *r*, the latter engaging and moving the plain fabric with the ruffle attached, while the ruffling-knife or blade engages only the strip to be gathered and carries it forward to the needle.

The end of the arm G carrying the ruffling-blade is turned backward at *g'*, moves back and forth above the guide, and permits the blade carried by such arm to operate under the edge of the plain unruffled material laid on top of the ruffled strip. As the blade moves forward it first engages the material to be ruffled resting on the supporting and separating plate just at the end of the tongue *h*, and as the blade moves forward the material to be ruffled its edge is held or pressed firmly against the material, and when the fold made in the material is properly formed for the action of the needle then the blade is retracted, and as it returns to its backward position the pressure of its end on the piece to be ruffled is lessened. The end of the ruffling-blade moves beyond the edge of the supporting or separating plate and carries the fold forward in the ruffled strip beyond the edge of said plate, and on the return of said blade the end of the supporting or separating plate, between which and the blade the material rests, is held by the end of said plate *i*, preventing the blade in its backward movement from carrying back with it the fold formed in the strip to be ruffled.

I am aware that a rough-surfaced feeder and ruffler have been employed to engage a piece of material to be ruffled, forming the gather in and moving the ruffled piece forward, the ruffler and feeder both engaging the ruffled strip, and in connection with such mechanism a separator has been employed to separate a band from the ruffled strip, the band being laid on the surface of the ruffled strip engaged on its under side by the ruffler and feeder made as four-motioned feeding devices; and I am also aware of United States Patent No. 14,475.

I do not claim as the invention of THOMAS ROBJOHN a flexible ruffling-blade adapted to operate on a strip to be ruffled when sustained on the cloth-plate of a sewing-machine; nor do I claim such a blade combined with a guide to present a single unfolded band-strip to the ruffled strip; nor do I claim such a blade connected with and operated by a rocking arm or lever moved from a vibrating member of the needle-operating mechanism, and controlled as to its backward movement by a set-screw; nor do I claim any of the specific combinations of devices claimed in an application filed June 22, 1875, for reissue of United States Patent No. 37,550 granted to John A. Pipo, January 27, 1863, said combinations of devices as expressed in such reissue claims being the invention of the said Pipo.

I claim—

1. In a ruffling or plaiting mechanism, the combination of a ruffling or plaiting blade, with a folding-guide whereby a strip of any suitable fabric may be properly guided to form and fold a band about the edge of a ruffle, substantially as described.

2. The combination of a ruffling or plaiting blade and folding-guide for properly directing the strip to form and fold a band about the edges of a ruffle, with stitching or sewing mechanism, substantially as described.

3. In a plaiting or ruffling mechanism, the combination of a guide having an inclosed channel-way for properly directing the strip to be ruffled, with the plaiting or ruffling blade, substantially as described.

4. The combination of a plaiting or ruffling blade and an inclosed channel-way or guide for properly directing the strip to be ruffled, with a stitching or sewing mechanism, substantially as described.

5. The combination of a plaiting or ruffling blade and guide for properly directing the strip to be ruffled, and a folding-guide for conducting a separate strip to form and fold a band on the edge of the said ruffled strip, with sewing mechanism adapted to unite the band and ruffle, substantially as described.

6. The combination with a ruffling or plaiting blade, of a guide for conducting a strip to form a band for the ruffle, and adapted to fold or hem both edges of said band.

7. The combination of a ruffling or plaiting blade, a guide adapted to conduct a strip to form a band and to fold both edges of said band, with a sewing mechanism, substantially as described.

8. The combination of a ruffling or plaiting blade or knife, arranged and operated above the cloth-plate, with a supporting or secondary plate, separate from the cloth-plate, between which and the blade or knife the fabric to be ruffled is held and advanced by the blade, substantially as described.

9. A plaiting or ruffling blade, arranged above the cloth-plate of a sewing-machine, and adapted to operate upon a surface other than such cloth-plate, whereby a strip of goods can be plaited or ruffled above a plain piece, substantially as described.

10. In a ruffling or plaiting mechanism, a presser or holder cut away at its lower side to permit the passage of a hem, substantially as described.

11. A folding-guide, adapted to conduct and fold a band, and provided with a nose or extended portion to direct and hold the band after it is folded, substantially as described.

12. The inclosed guide, in combination with the flexible tongue, adapted to press upon the goods passing through said guide to keep said goods flattened and straight, substantially as described.

13. In a ruffling mechanism, the combination of a blade, adapted to engage and fold or ruffle one piece of material, with a feeder, adapted to engage and move forward the unruffled material on which the ruffled material is delivered and secured by stitching, substantially as described.

14. In a ruffling or plaiting mechanism, the combination of a plate, adapted to separate the material to be ruffled from the unruffled material to which it is to be attached, with a reciprocating blade, adapted to press upon and engage the upper side of the material to be ruffled, to move forward with such material and present a fold for the action of the needle, and on the return stroke of the blade to relax its pressure on the material to be ruffled, substantially as described.

15. The combination of the ruffling-blade, adapted to move forward beyond the end of the supporting or separating plate, with the separating-plate adapted to retain the ruffled material from returning with the ruffling-blade, substantially as described.

16. The combination of a guide adapted to control each edge of the piece to be ruffled, and a ruffling or plaiting blade, having its edge extended across the material to be ruffled, with a solid or rigid pressing surface or holder, of a width to cover and flatten the ruffled or plaited material, substantially as described.

17. The combination, with a mechanism adapted to form a ruffle or plait, of a guide, provided with an inclosed channel-way, to guide the strip intended to be ruffled or plaited.

18. The combination, with a separator and a ruffling blade, of guides adapted to control and present the band-forming edges both above and below the strip to be ruffled, whereby a piece of fabric may be ruffled between two surfaces.

In testimony whereof I have signed my name to this specification in the presence of two subscribing witnesses.

GEO. H. WOOSTER,
*Assignee of Thomas Robjohn.*

Witnesses:
EDWARD HEATON,
J. R. NICHOLSON.